United States Patent [19]

Mysiak et al.

[11] 4,029,385

[45] June 14, 1977

[54] ELECTRICAL CONNECTOR AND MEANS OF MOUNTING SAME

[75] Inventors: Eugene J. Mysiak, Cicero; Allen J. Burry, Prospect Heights, both of Ill.

[73] Assignee: Molex Incorporated, Lisle, Ill.

[22] Filed: Apr. 22, 1976

[21] Appl. No.: 679,472

Related U.S. Application Data

[62] Division of Ser. No. 580,558, May 27, 1975, abandoned.

[52] U.S. Cl. .............................. 339/128; 248/27.3; 339/217.5
[51] Int. Cl.² ......................................... H02B 1/04
[58] Field of Search ................... 339/126 RS, 128; 248/27 R, 27 A

[56] References Cited

UNITED STATES PATENTS

| | | | |
|---|---|---|---|
| 2,464,778 | 3/1949 | Wagstaff | 248/27 R |
| 2,632,787 | 3/1953 | Thomas | 248/27 R |
| 2,928,065 | 3/1960 | Hennessy et al. | 339/128 |
| 3,091,679 | 5/1963 | Norden | 339/126 RS |
| 3,146,052 | 8/1964 | Burch et al. | 339/91 |

*Primary Examiner*—Roy Lake
*Assistant Examiner*—Neil Abrams
*Attorney, Agent, or Firm*—Louis A. Hecht

[57] ABSTRACT

An electrical connector including a housing made of insulation material and a generally flat electrically conductive terminal. The housing includes a generally channel-shaped terminal receiving cavity having a support surface joining two upstanding wall portions. A pair of flexible locking fingers extend from each of the wall portions over the support surface. The terminal is insertable into the cavity by being pressed downwardly over the fingers so that the fingers resiliently move to allow the terminal to be received between the support surface and the fingers.

The connector has a new and improved means for mounting the connector on a panel. The panel includes an aperture with a pair of mounting tabs formed thereon. The mounting means on the connector includes a slot to receive the ends of the tabs.

1 Claim, 6 Drawing Figures

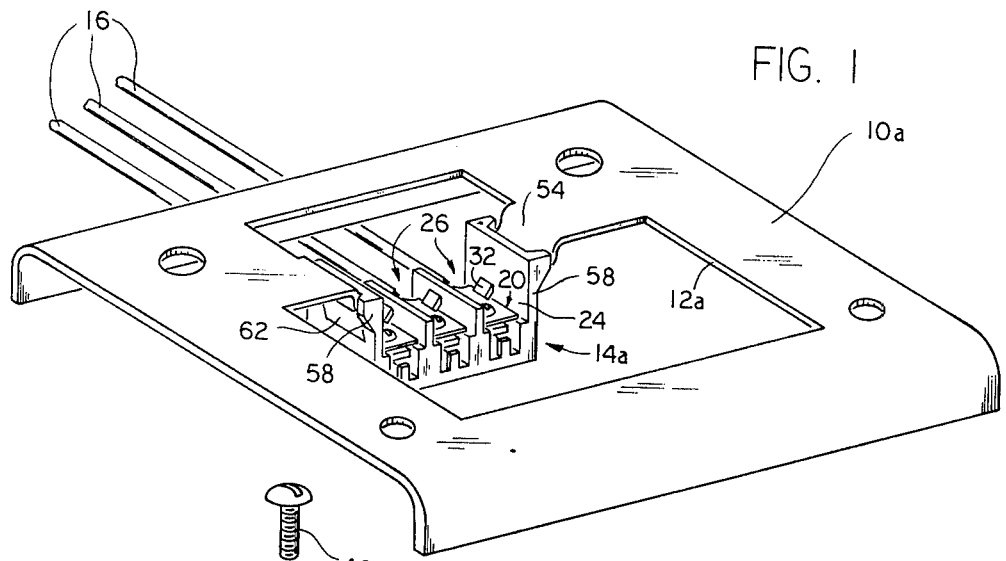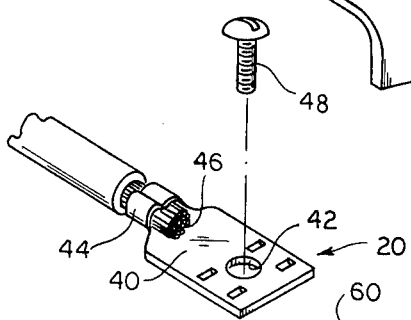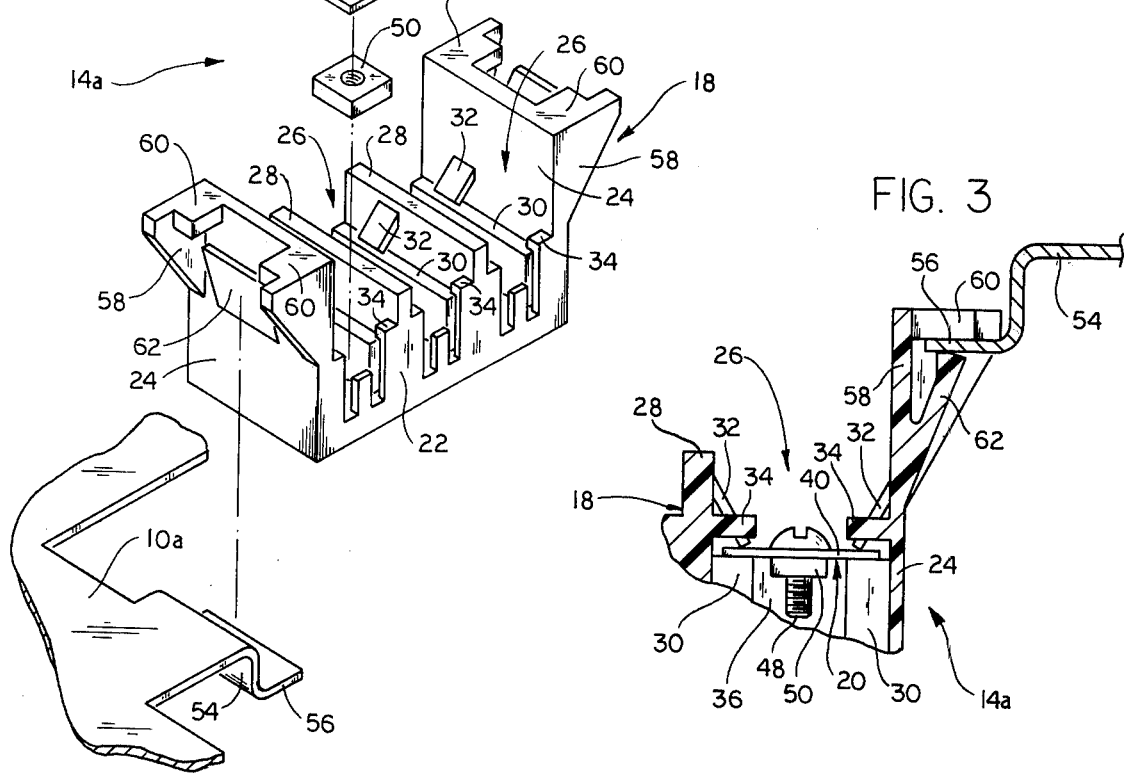

ELECTRICAL CONNECTOR AND MEANS OF MOUNTING SAME

This is a division of application Ser. No. 580,558 filed May 27, 1975 now abandoned.

BACKGROUND OF THE INVENTION

1. Field of the Invention

The present invention relates to electrical connectors and means of mounting electrical connectors onto panels.

2. Brief Description of the Prior Art

Electrical service connectors have been used in distributing large currents from a source throughout an appliance such as a refrigerator. These types of connectors are usually mounted on a panel forming a part of the appliance structure. Connectors of this type have proven to be relatively expensive to manufacture owing to the mounting problems and the size of the terminal.

Previous terminals were slidingly receivable in a connector housing terminal and were prevented from withdrawal by means of a spring action locking tang. The tang required more material and resulted in a terminal with thin sections that increase electrical resistance and operating temperature.

In addition, connectors were relatively bulky, and therefore, difficult to manufacture and handle because of the problems mounting the connector on a panel. As a result, the mounting means were expensive and undesirable.

SUMMARY OF THE INVENTION

It is therefore a principal object of the present invention to provide an electrical connector having an improved means to receive and hold a terminal which requires less material, and provides lower resistance and operating temperature. This object of the present invention is accomplished by one embodiment which includes housing made of insulation material which mounts a generally flat terminal. The housing has a generally channel-shaped terminal receiving cavity including a generally horizontal support means between two upstanding wall portions. A pair of flexible fingers extend inwardly, one from each of the wall portions over the support means. The terminal is inserted into the cavity by pressing it over the flexible fingers so that the fingers move to allow the terminal to seat flat between the support means and the fingers.

Another object of the present invention is to provide a new and improved means of mounting an electrical connector to a panel. One embodiment of the improved mounting means generally includes a pair of mounting tabs formed on the panel extending into an aperture toward one another in a plane substantially parallel to the plan of the panel and a pair of parallel, spaced apart tab receiving portions formed on the connector housing. Each tab receiving portion is adapted to mount one of the tabs perpendicular to the portion. Each tab receiving portion has slot means formed thereon to receive the respective tab. The two slot means are spaced apart a distance greater than the distance between the ends of the tabs. The slot means include resilient locking means allowing insertion of the tabs in the respective slot means.

Another embodiment of the improved mounting means generally includes a pair of parallel, spaced apart mounting tabs formed on the panel of the periphery of an aperture extending in a plane substantially perpendicular to the plane of the panel. Each tab has a locking tang struck therefrom. The connector housing has a pair of parallel, spaced apart tab receiving portions formed thereon. Each portion is adapted to mount one of the tabs and includes slot means formed thereon to receive the respective tab. The locking tang cooperates with the slot means to prevent withdrawal of the tab therefrom.

BRIEF DESCRIPTION OF THE DRAWINGS

FIG. 1 is a perspective view of a connector panel assembly of the present invention mounted on a panel;

FIG. 2 is an exposed perspective view of the assembly shown in FIG. 1;

FIG. 3 is a side sectional view of the assembly shown in FIG. 1;

DESCRIPTION OF THE PREFERRED EMBODIMENTS

Figure 5:
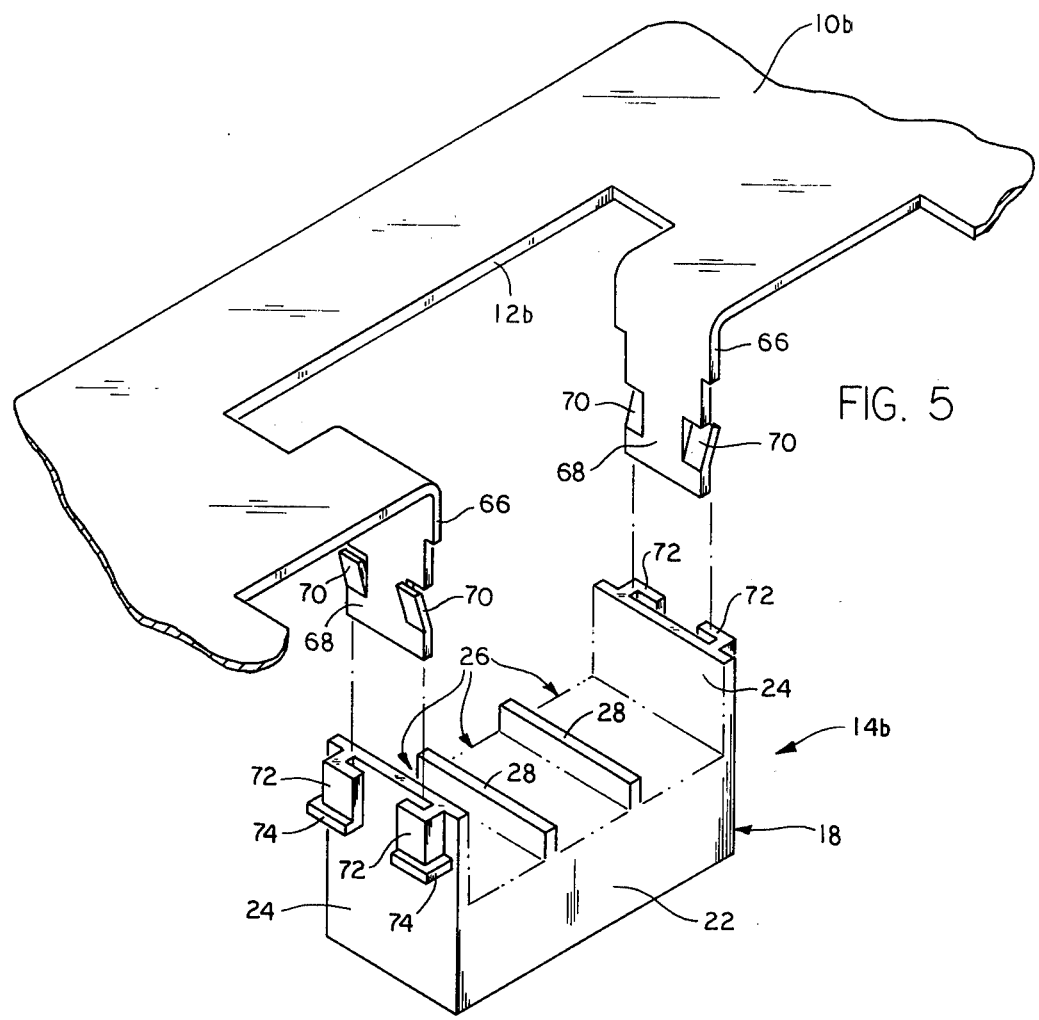
FIG. 5 is an exploded perspective view of a connector-panel assembly showing a different form of mounting the connector to the panel.
Figure 6:
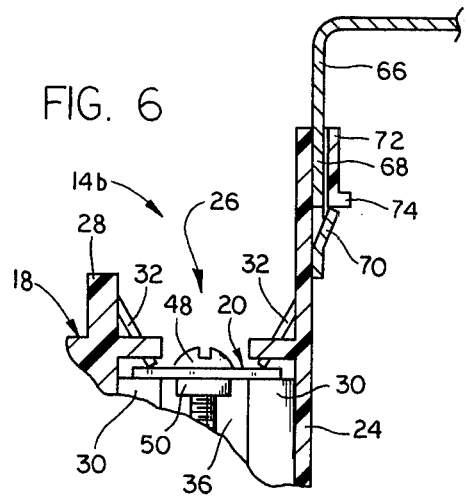
FIG. 6 is a side sectional view of the assembly of FIG. 5.

The drawings herein depict two different connector-panel assemblies. FIGS. 1-3 show a panel 10a having an aperture 12a formed therein which mounts a connector, generally designated 14a. FIGS. 5 and 6 show a like panel 10b having an aperture 12b formed therein which mounts a similar connector, generally designated 14b.

Each assembly is intended to receive and electrically connect a plurality of insulated service wires 16 (FIG. 1) with other circuit elements (not shown). The specific embodiments disclosed herein are particularly useful as service blocks for use in electrical appliances or the like.

The connectors 14a and 14b are alike in all respects except for the means in which they are mounted onto panel 10a or 10b. Accordingly, like reference numerals will be used when describing the like portions of connectors 14a and 14b.

Each connector 14a and 14b generally includes a housing, generally designated 18, made of insulation material. The housing 18 of both connectors 14a and 14b are identical except for the means of mounting the housing to the panel 10a and 10b. Each connector 14a and 14b also includes a plurality of terminals, generally designated 20, which are adapted to be received in the housing 18 in a unique manner which will be discussed in greater detail hereinafter.

The housing 18 is seen to include a body portion 22 having two outside wall portions 24 at either end thereof. Between the outside wall portions 24 there are formed within the body portion 22 three generally channel-shaped terminal receiving cavities 26, each defined between upstanding intermediate wall portions 28 and the outside wall portions 24. Each cavity 26 also includes a horizontal terminal support surface in the form of a pair of ledges 30 extending inwardly into each cavity from two adjacent wall portions 28 or 24 and 28. Ledges 30 serve as a floor to seat the respective terminal 20 when inserted into its respective cavity 26.

Each cavity 26 has a pair of flexible fingers 32, one extending inwardly toward the cavity from each of the wall portions 24 or 28. Each finger 32 is flexible and is canted downwardly toward its respective ledge 30. The distance between the end of each finger 32 and its respective ledge 30 is somewhat larger than the thickness of the terminal 20. The fingers 32 serve to retain a terminal 20 which has been received in its respective cavity 26.

Each cavity 26 also has a terminal stop 34 (FIG. 4) formed at one end thereof. The terminal stop 34 serves to define the furthest insertion of the terminal into the cavity 26 and aids in the insertion of the terminal 20 in a manner which will be described in greater detail hereinafter.

A depression 36 is provided between the ledges 30 of each cavity 26. The depression 36 allows for the connection of wires with the inserted terminals (not shown).

As best seen in FIG. 2, each terminal 20 is seen to generally include a flat spade-like contact portion 40 having a round hole 42 formed therein. A crimp section 44 is formed at one end of the contact portion 40 which is adapted to electrically grip the conductors 46 of the wires 16.

Figure 4:
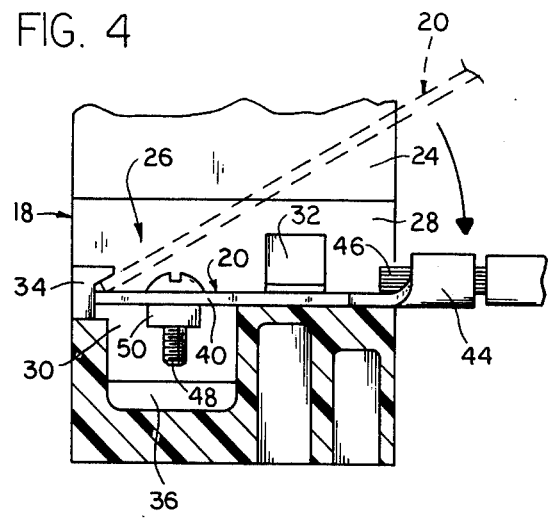
FIG. 4 is a side sectional view of the connector of the present invention showing how the terminal is inserted therein.

A screw 48 and nut 50 are provided to be fastened through hole 42. When the terminal 20 is inserted within its respective cavity 26, as best shown in FIG. 4, the bottom of screw 48 is located within the depression 36. Another wire (not shown) can be secured to screw 48 and nut 50 in the conventional manner to provide an electrical connection between the terminal 20 and another part of an appliance.

FIG. 4 illustrates the manner in which the terminal 20 is insertable within a cavity 26. The front edge of the terminal 20 is first abutted against the terminal stop 34 as shown in phantom in FIG. 4. The terminal 20 is then pivoted downwardly until the edges thereof engage the flexible fingers 32. Upon further downward movement, the fingers 32 will be forced to move toward their respective walls 24 or 28 to allow the terminal 20 to seat flat against the ledges 30 as shown in FIG. 4. After the terminal 20 is so seated, the fingers 32 spring back to their initial position and act to retain the inserted terminal 20 within the cavity 26 as best shown in FIGS, 3, 4 and 6.

Because it is no longer necessary to have a locking tang struck from the terminal contact portion, thinner stock can be used to produce the terminal. This lowers the cost of the assembly.

Turning now to the particular means of mounting connector 14a to panel 10a as shown in FIGS. 1–3, the panel 10a is seen to include a pair of mounting tabs 54 extending into aperture 12a toward one another in a plane substantially parallel to the plane of the panel. Each tab 54 has a connector engaging portion 56. The housing 18 of connector 14a includes a pair of parallel, spaced apart tab receiving portions, generally designated 58 extending from the side walls 24 of the housing. Each portion 58 is adapted to mount one of the tabs 54 perpendicular thereto.

Each portion 58 includes slot means formed thereon defined by a top abutment 60 and a bottom upwardly canted flexible finger 62 as best shown in FIG. 3. The connector engaging portion 56 is adapted to be received between the abutment 60 and the top of the flexible finger 62.

The slot means formed on both portions 58 are spaced apart a distance greater than the distance between the connector engaging portions 56. However, because the fingers 62 are resilient, they are movable toward one another to allow insertion of the connector engaging portions 56 in the slot means when the connector 14a is pushed into the aperture.

The manner in which the other connector 14b is mounted to panel 10b is best shown in FIGS. 5 and 6. The panel 10b includes a pair of parallel spaced apart mounting tabs 66 formed thereon on the periphery of the aperture 12b extending in a plane substantially perpendicular to the plane of the panel. Each tab 66 has a connector engaging portion 68 with a pair of locking tangs 70 struck therefrom.

The connector 14b has slot means formed on the outside wall portions 24, each being defined by a pair of partial guide slot portions 72 as best seen in FIG. 5. Each slot portion 72 is adapted to mount one of the connector engaging portions 68. The locking tangs 70 cooperate to a lip 74 formed at the bottom of each slot portion 72 to prevent withdrawal of the tab 66 after insertion as best shown in FIG. 6.

We claim:

1. In combination, a panel with an aperture formed therein, a connector housing adapted to be mounted on said panel, and mounting means cooperating between said panel and said housing to mount said housing on said panel, the improvement in said mounting means comprising:

a pair of mounting tabs formed on said panel extending into the aperature toward one another in a plane substantially parallel to the plane of said panel; and a pair of parallel, spaced apart tab receiving legs formed on said housing, each adapted to mount one of said tabs with said tabs extending perpendicular to said leg, each leg including slot means formed thereon to receive the respective tab, the outer portions of one of said slot means being spaced apart from the outer portions of the other slot means, a distance greater than the distance between the ends of said tabs each slot means having resilient locking means located therein for allowing insertion of the tabs in the respective slot means past said locking means and thereafter blocking withdrawal of said tabs.

* * * * *